United States Patent [19]

Engle et al.

[11] 4,105,257
[45] Aug. 8, 1978

[54] ELECTRO-PNEUMATIC APPARATUS FOR GRADUATED BRAKE RELEASE

[75] Inventors: Thomas H. Engle, Cape Vincent, N.Y.; John J. Harris, Meadville, Pa.

[73] Assignee: General Signal Corporation, Rochester, N.Y.

[21] Appl. No.: 792,386

[22] Filed: Apr. 29, 1977

[51] Int. Cl.² .......................................... B60T 13/70
[52] U.S. Cl. ...................................... 303/15; 303/3; 303/74
[58] Field of Search .............................. 303/3, 15–16, 303/20, 36, 74, 82

[56] References Cited
U.S. PATENT DOCUMENTS 2,897,011  7/1959  Cotter ............................... 303/20 X
3,510,173  5/1970  Enavi et al. ........................ 303/36

*Primary Examiner*—Stephen G. Kunin
*Attorney, Agent, or Firm*—Pollock, Vande Sande & Priddy

[57] ABSTRACT

An electro-pneumatic circuit is provided for cycling a holding magnet valve located in the brake cylinder exhaust pipe of a rail car brake system. As brake pipe pressure rises to signal full or partial release of the brakes, the holding valve is alternately opened and closed to provide a graduated release. The circuit is particularly adapted for rail cars having an electrical train line for controlling the holding valve to permit such cars to be used with other types of cars having a purely pneumatic control for graduated brake release.

10 Claims, 3 Drawing Figures

ELECTRO-PNEUMATIC APPARATUS FOR GRADUATED BRAKE RELEASE

BACKGROUND OF THE INVENTION

Numerous types of rail car brake systems are in use today. Some are pneumatically operated; some, electrically; others, electro-pneumatically. While various nationally recognized standards ensure that rail cars of different carriers are compatible with each other in most respects so that trains may be made up from cars of several carriers, there are some brake systems which provide features not really compatible with the systems of other rail cars. Of course, the differences may be desirable to suit some specific requirement of an individual carrier; but, nonetheless, to the extent a rail car is incompatible with other cars in use, its applications become limited.

There are two basic types of brake control valves in general use today. The first is the "direct release" control valve which applies the brakes in proportion to the reduction of brake pipe pressure and releases the brakes directly on any increase in brake pipe pressure. The second is the "graduated release" type valve commonly used in passenger trains which applies the brakes in proportion to brake pipe pressure reduction, but releases the brakes in proportion to the restoration of brake pipe pressure.

In service then, the graduated release valve permits smoother control of a train by permitting an engine man to partially release brakes. In contrast, partial release of brakes with a direct release valve is impossible; and if an engine man determines that he is stopping too fast, he must completely release the brake, and then re-apply it.

The prior art discloses an electro-pneumatic system for effecting a graduated release of brakes with a direct release control valve by placing a "holding magnet valve" in the exhaust pipe from the control valve, and energizing or de-energizing this magnet valve by response to manual manipulation of the engine man's brake valve so as to prevent or permit exhaust from the control valve even though this valve is, at all times, in its "release" configuration.

Difficulties arise when cars having graduated release control valves are to be coupled with cars having the electric holding valve type of graduated release. If cars equipped with graduated release type control valves continue to provide graduated release while those equipped with the holding magnet valve and direct release control valve do not, due to the absence of their usual controller, the undesirable condition arises where the brakes on some cars will be fully released while those on others will be still applied. Those skilled in the art will appreciate that under various operating conditions, this can produce discomfort to passengers because of slack action as the unbraked cars try to move toward or away from the braked cars to which they are coupled. Overheating of the wheels of the braked cars may also result.

OBJECTS OF THE INVENTION

An object of this invention is to provide a simple electro-pneumatic adjunct to electrically controlled graduated release systems to provide full compatibility with pneumatically controlled graduated release systems.

Another object of this invention is to provide such a system which will not interfere with normal operation of the electrically controlled graduated release.

Yet another object of this invention is to provide such a system which does not require an electrical train wire to be added to pneumatically controlled cars to provide compatibility.

The above objects are given only by way of example. Thus, other desirable objects and advantages inherently achieved by the disclosed invention may occur to those skilled in the art. Nonetheless, the scope of the invention is to be limited only by the appended claims.

SUMMARY OF THE INVENTION

The above objects and other advantages are achieved with the disclosed invention which is particularly adapted for providing a graduated, pneumatically controlled release in a rail car brake system of the type having an electrically controlled, normally open holding valve for controlling depressurization of the brake cylinders when the control valve is in the release position. The invention makes such a rail car brake system compatible for use with rail car brake systems in which graduated release is controlled pneumatically. The apparatus includes a brake pipe which passes fluid pressure signals along the rail car to control application and release of the brake actuators and a source of electrical power having an output circuit connected to the holding valve to close it when current flows through the output circuit. Means are provided for alternately opening and closing the output circuit in response to repressurization of the brake pipe to effect release of the brake actuators, thereby providing graduated release of pressure in the brake cylinder as the holding valve opens and closes.

More specifically, in addition to the brake pipe and source of electrical power, the apparatus of the invention includes an auxiliary volume and a normally closed switch connected in the output circuit to conduct current from the power source. The switch opens the output circuit when the pressure in the brake pipe exceeds the pressure in the auxiliary volume by a predetermined amount. A second switch also connected in the output circuit closes the output circuit when the pressure in the brake pipe falls below a preselected value. Flow control means are provided which respond to current flow in the output circuit to connect the auxiliary volume to the brake pipe when the output circuit is open. Also, means are provided for ensuring that the pressure in the auxiliary volume is less than or equal to the pressure in the brake pipe. By these means, the output circuit is closed to close a flow control means and the holding valve upon depressurization of the brake pipe to signal a brake application. During repressurization of the brake pipe to signal brake release, the output circuit is alternately opened and closed to provide graduated restoration of pressure in the auxiliary volume to match that of the brake pipe. The output circuit simultaneously controls operating of the holding magnet which cycles in step with the flow control means, permitting equalization of auxiliary volume pressure with brake pipe pressure and simultaneously permitting exhaust of brake cylinder pressure. The time required to restore the pressure in the auxiliary volume is controlled by the flow controller in such a way as to approximate the time required to release air from the brake cylinder as the holding valve opens and closes.

DETAILED DESCRIPTION OF THE PREFERRED EMBODIMENTS

Figure 1:
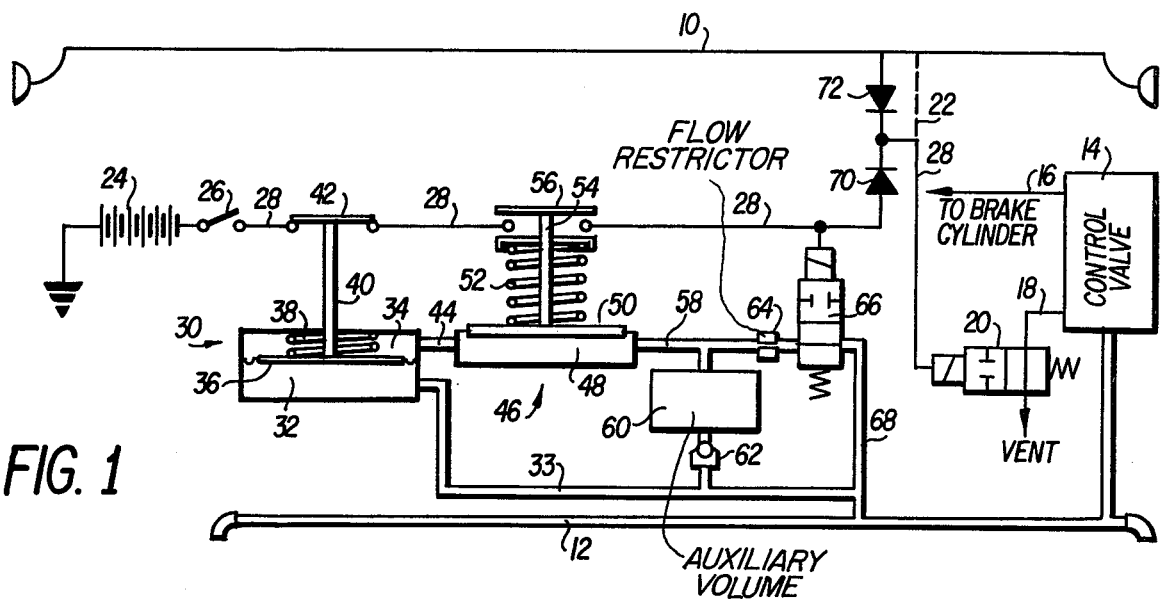
FIG. 1 shows a schematic view of a rail car brake system embodying the invention.

There follows a detailed description of the preferred embodiments of the invention, reference being had to the drawings in which like reference numerals identify like elements of structure in each of the several figures.

FIG. 1 shows numerous components found in prior art brake systems in which an electrically controlled holding valve is provided for controlling depressurization of the brake cylinder pipe. An electrical train line 10 extends through each rail car in the conventional manner, in parallel with a brake pipe 12 which conveys brake application and release signals in a manner understood by those skilled in the art. A pneumatically actuated control valve 14 is connected to brake pipe 12. In the systems having electrically controlled holding valves, control valve 14 may be of the direct release type. A brake cylinder pipe 16 connects control valve 14 to the brake cylinders or actuators of the system (not shown). Upon repressurization of brake pipe 12 to effect a brake release, control valve 14 permits the pressure in brake cylinder pipe 16 to dissipate into a brake vent pipe 18. A holding magnet valve 20 is connected into brake vent pipe 18. Holding magnet valve 20 is normally spring biased to an open position so that it performs no particular function during brake application since control valve 14 prevents depressurization of brake cylinder pipe 16 therethrough. However, in the electrically controlled system known in the prior art, holding magnet valve 20 is closed upon receipt of a signal from train line 10 so that the pressure in the brake cylinder will be held even after control valve 14 has interconnected brake cylinder pipe 16 and brake vent pipe 18. Then, by operating valve 20, it is possible in the prior art systems to control the brake release as desired. A phantom conductor 22 indicates the usual interconnection of holding magnet valve 20 to train line 10 in the prior art systems.

Such a prior art system is adapted according to the invention for graduated brake release by the addition of the remaining components shown in FIG. 1. A source of electrical power is provided such as a battery 24; however, alternating current may be used if desired without departing from the invention. The output current from battery 24 is conducted via a cut out switch 26 to an output circuit 28 which is connected to close holding magnet valve 20 when current flows in output circuit 28. A normally closed, differential pressure switch 30 is connected into output circuit 28. Differential pressure switch 30 comprises a brake pipe pressure volume 32 which is connected to the brake pipe by a conduit 33. A reference pressure volume 34 is also provided which is separated from brake pipe pressure volume 32 by a flexible diaphragm 36. A biasing spring 38 biases diaphragm 36 toward brake pipe pressure volume 32 so that differential pressure switch 30 will close when the pressure in reference pressure volume 34 is lower than the pressure in brake pipe pressure volume 32 by a predetermined amount. A rod 40 is connected to diaphragm 36 to move with it in response to pressure changes in volumes 32 and 34. Finally, a switch element 42 is attached to rod 40 in position to open and close output circuit 28.

A conduit 44 interconnects reference pressure volume 34 and a normally open pressure switch 46 which includes a reference pressure volume 48. Reference pressure volume 48 is closed on one side by a flexible diaphragm 50 which is biased into reference pressure volume 48 by means such as a spring 52 so that pressure switch 46 remains closed until the pressure in reference pressure volume 48 reaches a predetermined minimum such as 100 pounds per square inch. A rod 54 is connected to diaphragm 50 to move with it. Finally, a switch element 56 is connected to rod 54 to open and close output circuit 28 in response to variations in the pressure in volume 48. Volume 48 alternatively may be connected in conduit 33 to make switch 46 more responsive to brake pipe pressure. The purpose of switch 46 is to ensure free venting of the brake cylinders to atmosphere when brake pipe pressure reaches the nominal release value, so as to safeguard against stuck brakes.

A conduit 58 connects reference pressure volume 48 to brake pipe 12 and to an auxiliary volume 60. A check valve 62 connects auxiliary volume 60 to brake pipe 12 so that the pressure in auxiliary volume 60 is always less than or equal to the pressure in brake pipe 12. Auxiliary volume 60 is pressurized from brake pipe 12 through a flow restrictor 64 which controls the rate of pressurization and depressurization of volumes 60, 48 and 34, in the illustrated embodiment. A normally open, solenoid actuated valve 66 is connected to control flow through restrictor 64. Valve 66 closes in response to current in output circuit 28 and otherwise remains in its illustrated, open position. A conduit 68 connects valve 66 to brake pipe 12. Finally, output circuit 28 and train line 10 are interconnected by a pair of blocking diodes 70, 72 which permit current flow to holding valve 20 from either output circuit 28 or train line 10 while preventing current flow between output circuit 28 and train line 10. Since valve 66 and valve 20 always cycle in unison, they could be combined in one valve or driven by one actuator, as will be apparent to those skilled in the art.

The operation of the apparatus shown in FIG. 1 is as follows. When the brakes are released, the pressure in brake pipe 12 is at its maximum and the brake cylinder pipe 16 is vented to atmosphere. Volumes 32 and 34 are at equal pressures so that switch 30 is closed. Since the brake pipe pressure is above 100 psi prior to application, switch 46 is opened. During brake application, the brake pipe pressure drops until a point is reached where switch 46 closes, thus completing output circuit 28 since switch 30 remains closed. Auxiliary volume 60 depressurizes through check valve 62, more or less keeping pace with the reduction in brake pipe pressure. Valve 66 closes when circuit 28 is completed, thus preventing depressurization via choke 64. Valve 20 also closes but has no effect since control valve 14 is in complete control during brake application. During brake release, the pressure in brake pipe 12 will gradually rise until switch 30 opens, thereby breaking circuit 28. Valve 66 opens to permit repressurization of auxiliary 60 and reference volumes 34 and 48. Valve 20 opens to permit brake cylinder pressure to exhaust to atmosphere. As the pressure in volume 34, 48 and 60 rises, switch 30 will eventually close again, thereby shutting valves 66 and 20. As brake pipe pressure continues to rise, the previously described cycle will be repeated so that the drop in brake cylinder pressure is graduated in step with the rise in brake pipe pressure. Finally, when the brake pipe pressure exceeds 100 psi, switch 46 will open at the time of full brake release, thus opening valves 64 and 20 until the next brake application is made.

Figure 2:
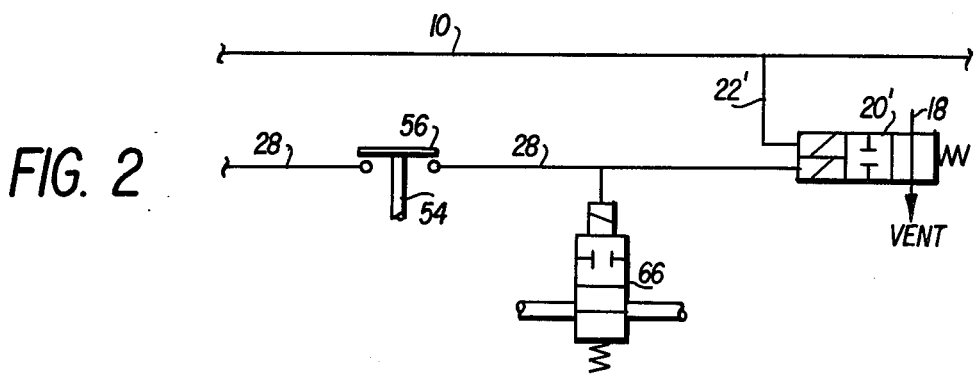
FIGS. 2 and 3 show schematic views of alternate circuit forms for controlling the holding magnet valve either in response to pneumatic signals in the brake pipe or in response to electrical signals on the train line.
Figure 3:
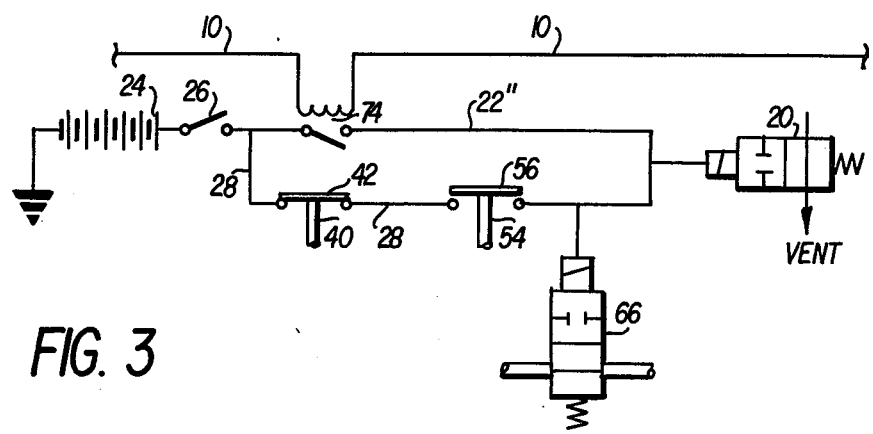

FIGS. 2 and 3 show alternate forms of interconnection of the electrical and pneumatic control circuits. In FIG. 2, the holding magnet valve is a double coil magnet valve 20', having one coil thereof connected to train line 10 by connector 22' and the other coil thereof connected to output circuit 28. Thus, holding magnet valve 20' may be actuated by signals from either circuit 28 or train line 10. In FIG. 3, the output from battery 24 may be connected to flow either through output circuit 28 or through a parallel conductor branch 22'' which includes a relay 74 actuable by signals flowing on train line 10 to permit or prevent current flow from battery 24 through conductor branch 22''. Again, this arrangement permits actuation of holding magnet valve 20 either by signals on train line 10 or by signals on output circuit 28. Of course, where there is no need to isolate line 10 and circuit 28, as is the case where one power source is used for the locomotive and the cars, both line 10 and circuit 28 may be connected directly to the actuator for valve 20 (not shown).

Having described my invention in sufficient detail to enable those skilled in the art to make and use it, I claim:

1. Apparatus for providing graduated, pneumatically controlled brake pressure release in a rail car brake system of the type having an electrically controlled, normally open holding valve for controlling depressurization of brake cylinders of rail car brake actuators, said apparatus comprising:
    a brake pipe for passing fluid pressure signals along said rail car brake system to control application and release of said brake actuators;
    a source of electrical power having an output circuit connected to close said holding valve when current flows in said output circuit;
    an auxiliary volume;
    first normally closed switch means connected in said output circuit to conduct current from said source, for opening said output circuit when the pressure in said brake pipe exceeds the pressure in said auxiliary volume by a predetermined amount;
    flow control means responsive to current flow in said output circuit for connecting said auxiliary volume to said brake pipe when said output circuit is open; and
    means for maintaining the pressure in said auxiliary volume no greater than the pressure in said brake pipe,
    whereby said output circuit is alternately opened and closed during repressurization of said brake pipe to signal a brake release, thereby providing graduated release of pressure in said brake cylinder pipe as said holding valve opens and closes.

2. Apparatus according to claim 1, further comprising flow restriction means for limiting the flow rate between said auxiliary volume and said brake pipe to permit timing of the restoration of auxiliary volume pressure with exhaust of brake cylinder pressure.

3. Apparatus according to claim 1, wherein said rail car brake system also has an electrical train line for conducting control signals for said holding valve, further comprising: a branch conductor in said output circuit connected in parallel with said first switch means between said source of electrical power and said holding valve; and relay means connected in said branch conductor and actuable by said control signals for opening and closing said branch conductor in response to said control signals.

4. Apparatus according to claim 1, wherein said rail car brake system also has an electrical train line for conducting control signals for said holding valve and said holding valve is a magnet valve having first and second magnet coils, further comprising a first conductor connecting said output circuit to said first magnet coil and a second conductor connecting said train line to said second magnet coil.

5. Apparatus according to claim 1, wherein said rail car brake system also has an electrical train line for conducting control signals for said holding valve, further comprising blocking diode means for permitting current flow to said holding valve from either said output circuit or said train line while preventing current flow between said output circuit and said train line.

6. Apparatus according to claim 1, further comprising second normally open switch means also connected in said output circuit to conduct current from said source, for closing said output circuit when said pressure in said auxiliary volume falls below a preselected value.

7. Apparatus according to claim 1, wherein said first switch means comprises a differential pressure responsive diaphragm spring biased on the side of said diaphragm exposed to said pressure in said auxiliary volume.

8. Apparatus according to claim 1, wherein said flow control means comprises a solenoid actuated valve and a flow restrictor.

9. Apparatus according to claim 1, wherein said means for maintaining the pressure comprises a check valve permitting flow from said auxiliary volume to said brake pipe.

10. Apparatus for providing graduated, pneumatically controlled brake pressure release in a rail car brake system of the type having an electrically controlled, normally open holding valve for controlling depressurization of brake cylinder pipe leading to rail car brake actuators, said apparatus comprising:
    a brake pipe for passing fluid pressure signals along said rail car brake system to control application and release of said brake actuators;
    a source of electrical power having an output circuit connected to close said holding valve when current flows in said output circuit; and
    means for alternately opening and closing said output circuit in response to repressurization of said brake pipe to effect release of said brake actuators, thereby providing graduated release of pressure in said brake cylinder pipe as said holding valve opens and closes.

* * * * *